May 5, 1953 T. BACKUS ET AL 2,637,221
CHANGE-SPEED GEARING
Filed Dec. 16, 1949 3 Sheets-Sheet 1
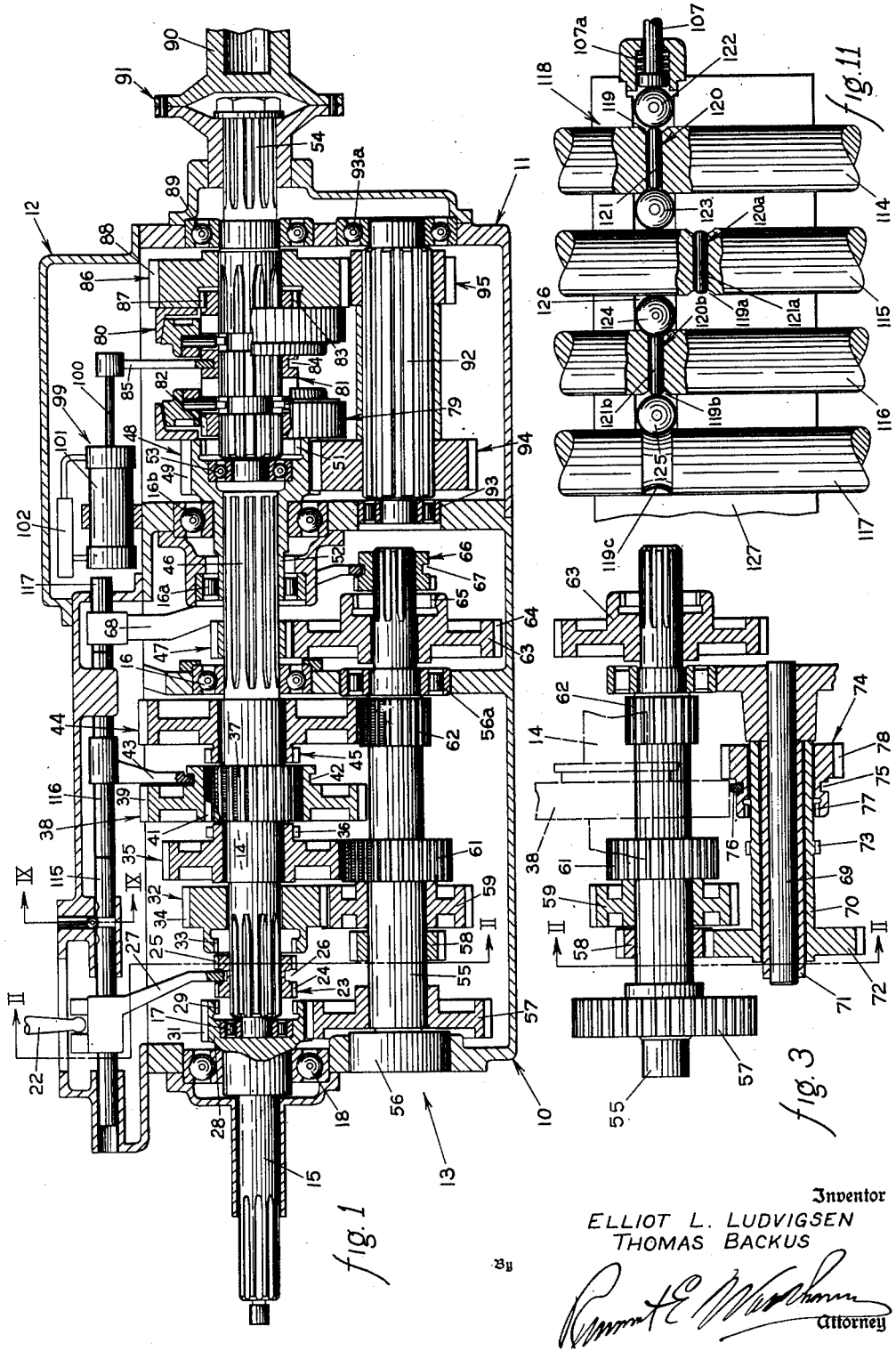
Inventor
ELLIOT L. LUDVIGSEN
THOMAS BACKUS
By
Attorney

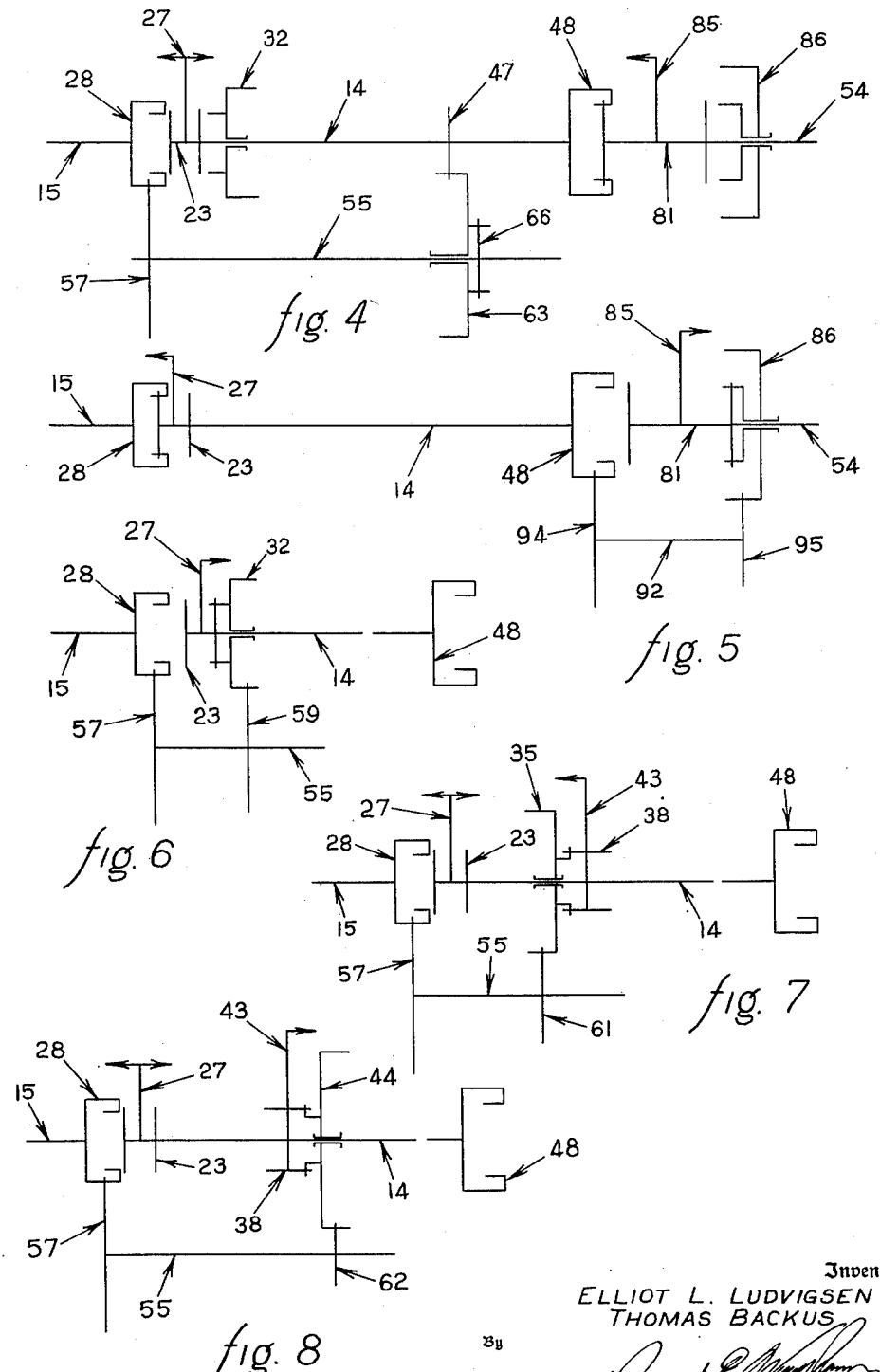

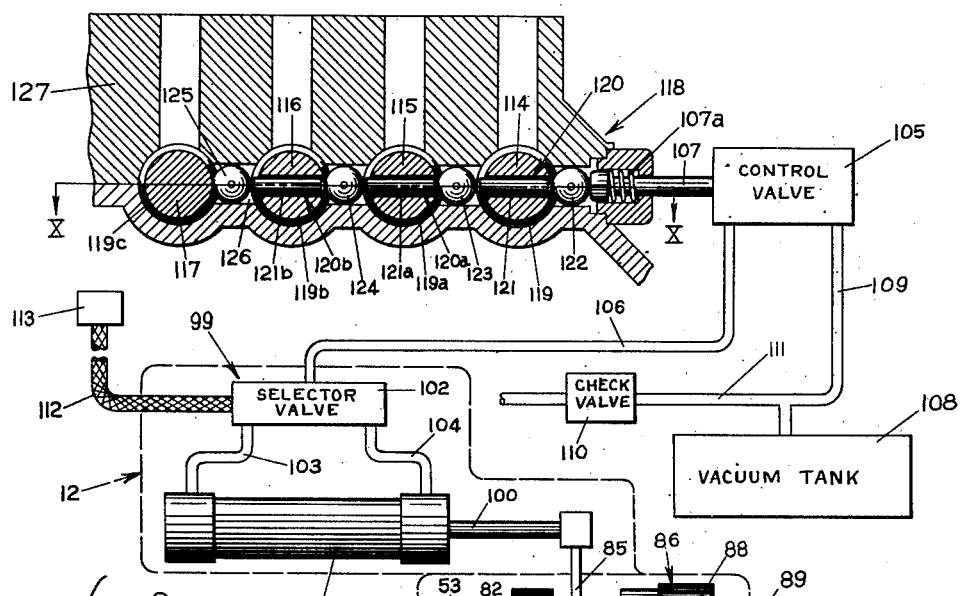
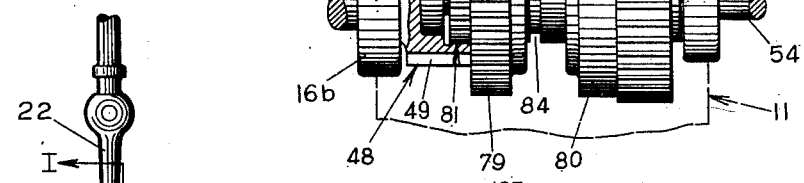
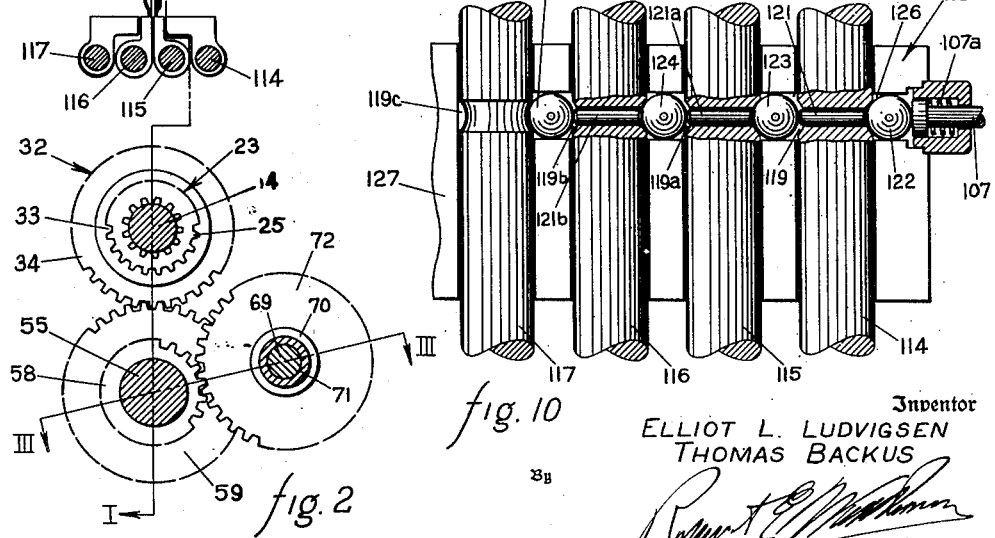

Patented May 5, 1953

2,637,221

UNITED STATES PATENT OFFICE 2,637,221

CHANGE-SPEED GEARING

Thomas Backus and Elliot L. Ludvigsen, Kalamazoo, Mich., assignors to Fuller Manufacturing Company, a corporation of Delaware Application December 16, 1949, Serial No. 133,404

33 Claims. (Cl. 74—745)

This invention relates to transmissions and particularly to a type of transmission assembly which is especially applicable to use on heavy vehicles, such as trucks, or to other uses wherein a larger number of gear ratios is required than can conveniently be provided in presently known unit arrangements.

In the operation of heavy vehicles, such as trucks, having transmissions with a large number of gear ratios, it is well known that the skill required of the driver to shift the transmission has been far greater than that possessed by the average driver of a passenger automobile. Often the transmission concerned has two separate controls which must be simultaneously operated, and operated with great skill in timing, in order to effect a shift. The driver is often required momentarily to neglect the steering wheel in order to have both hands available for operating the transmission shift levers. The inconvenience, as well as the danger, incident to such an arrangement is, and long has been, obvious.

Since this problem has been recognized for many years, a great deal of effort has been expended both by individuals and by automotive companies, including those specializing in the manufacture of transmissions, to provide a transmission having a large number of gear ratios without these awkward and dangerous multiple controls.

In the usual approach to this problem, there has been provided a forward, or main, transmission section or box having, for example, five speeds forward (and one reverse) in combination with a rear, or auxiliary, transmission section, or box, having two speed ratios. Examples of such main and auxiliary transmission boxes may be found in Patents No. 1,887,943, No. 1,916,892 and No. 2,465,885. In such a combination, the gears in the main transmission box have often been designed to provide substantially a full range of speed ratios, such as from low speed to overdrive, and the gears in the auxiliary transmission box have been designed so that when in one position the output speed of the main transmission box is delivered directly to the vehicle's propeller shaft, and when in the other position the output speed from the main transmission box is reduced by an amount approximately equal to half the speed differential between two successive speed ratios in the main transmission box. In other words, the auxiliary box had been used to "split" the ratios of the main box into approximate half steps throughout their range, and also to provide a similar one half step decrease in the lowest output speed provided by the gears in the main box.

In the following discussion and description, the term "step" or "full step" will refer to the difference in ratios between gears in the main box as now commonly used, and the term "half step" will refer to the difference between ratios arising from a shift involving also a change in the auxiliary box as practiced in present common constructions. This terminology is selected with reference to the present practice of using the auxiliary to split the main box ratios since it is now in common use and will be generally understood.

Although the occurrence, if not the solution, of the problem under consideration herein has been clearly apparent to the transmission manufacturing and utilizing industries for a long time, the following two examples may further assist to focus attention upon the precise point here involved.

Starting with the main transmission box in its lowest gear speed (greatest ratio) and the auxiliary transmission box in the reduction position, a truck engine may deliver its maximum torque to the wheels. The first shift of the transmission assembly is made in the auxiliary box only, from reduction to direct drive, and this involves no great problem beyond the usual one of slowing the mainshaft of the main box slightly and synchronizing the reengagement of the gears in the auxiliary box into direct drive. However, the second shift step in the transmission assembly requires the simultaneous shifting of the auxiliary box from direct drive to reduction and of the main box from first to second gear positions. Since no power is transmitted to the wheels during shifting, this shift must be accomplished smoothly and quickly or the speed of the propeller shaft will drop below the speed at which the intended gear ratio can be used, thus resulting in the necessity of shifting back to the first gear and starting the series over again. Where trucks are used in mountainous terrains, this problem has long been extremely acute.

The same problem occurs also in a downshift progression. With the main box in overdrive and the auxiliary box in direct drive, the first down step is easily accomplished merely by shifting from overdrive in the main box to direct drive. The next step is equally easy in that it requires merely shifting from direct to reduction in the auxiliary box. However, the next downward shift requires the shifting of the main box from direct drive to the first step below direct drive and also the simultaneous shifting of the auxiliary box from reduction to direct drive.

With four speeds, in addition to over-drive, forward in the main box and two speeds in the auxiliary box, this simultaneous shifting of the two boxes must be accomplished three times during each progression through the gear ratios from either extremity to the other.

Shifting in the above manner is made even more difficult by the increasing use of diesel engines, wherein the limited speed range available in the engine severely limits the speeds at which, and the time during which, a shift can be made. Even with a given vehicle, varying loads, varying road conditions and varying grades all combine to complicate the problem endlessly. This situation becomes more graphic when it is recalled that, upon the release of the accelerator, the gears in the transmission change speed so rapidly that in a fraction of a second their rotational velocity will change by several hundred revolutions per minute. For example, in one type of transmission used with a gasoline engine on a ten ton truck, tachometer observations of the main transmission shaft showed a decrease of approximately 500 R. P. M. in periods of time averaging about 0.4 second. With these rapid changes taking place, it is evident that the period of substantial synchronism is very short. Thus, the skill required of a driver, especially in mountain driving, is exceedingly great.

We have discovered that by relatively slight, but heretofore unconceived, mechanical modifications of conventional transmission parts, together with a change from conventional ratios, all but one of the above mentioned difficult double shifts can be eliminated from the entire range of the shift progression. Furthermore, this one remaining double shift can be accomplished easily and with only one hand.

We have also discovered that such modifications will also eliminate all but one of the eight shifts presently required in the auxiliary box of a transmission assembly, such as described above, having nine shift speeds in its speed range from one end thereof to the other.

Thus, we have provided a transmission assembly which can be operated from one end of its shift range to the other by one hand and with such ease that even a novice with a fair degree of dexterity can shift the gears thereof after only a few minutes of instruction and practice.

Broadly, our new concept involves first shifting one box into neutral and then completing the shift in the other box before said box is shifted out of neutral. In this way, the connection through the box in which the shift is completed first may be utilized to effect synchronization in the box in which the shift is completed last. Thus, it becomes possible to effect easily shifts which are extremely difficult, if not substantially impossible, to complete by conventional methods.

More specifically, and in connection with the particular and preferred embodiment of the invention here selected for illustrative purposes, the heart of this new transmission originates in the recognition that, when the double shift is required, a shift in the auxiliary box prior to completing the shift of the main box, and while the main box is in neutral, will change the speed of that shaft of the main box to which it is connected to a speed only slightly different from the speed at which it will be rotating when the main box becomes engaged. Thus, shifting of the main box becomes easy. However, in this embodiment it is critical that (1) the auxiliary box be shifted first, (2) that it be shifted while the main box is in neutral, (3) that this shift commence a sufficient length of time ahead of the shifting of the main box out of neutral to enable the synchronizing parts to engage and speed up, or slow down as the case may be, the main shaft of the main box before the main box is shifted and (4) that all of these steps happen sufficiently quickly that the entire shift is completed before the slowing down of the vehicle as a whole goes beyond the point at which the necessary speed of the engine will permit effective re-engagement. This last point may be emphasized by mentioning that in a particular embodiment of the invention in a ten ton truck equipped with a gasoline engine it has been observed that even on level ground if more than about two seconds are taken to complete the total shift, the truck has lost too much speed and the shift becomes difficult. On an upgrade, this time becomes even less.

To accomplish these results, we have in the preferred embodiment provided closely spaced gear ratios in the main box, said ratios being approximately equivalent to the half step differentials of the formerly known arrangements of a main and auxiliary transmission assembly, and have then provided a wide speed differential in the auxiliary box which is preferably about one half step greater than the entire range represented in the main transmission. Thus, with each speed in the main box differing from the next successive speed by a one half step differential, as compared with said conventional transmission arrangements, shifting through substantially one half of the total range of our transmission assembly may be effected in half steps by shifting only the gears in the main box, and without any shifting of the auxiliary box gears. When our main box has been shifted to the end of its range with the auxiliary box in one position, it is then shifted back to the beginning and the auxiliary is simultaneously shifted to its other position. The main box may then be shifted again through its entire range of half steps to complete the total range of the entire transmission assembly. It will be evident that this procedure may be used for either an upshift or a downshift progression.

Since it is essential in the present preferred embodiment to shift the auxiliary box while the main box is in neutral position, means are provided by which this shift takes place only at such a time. This means may, of course, be a separate, manually operated, shift lever, as used in many conventional auxiliary boxes, but, for reasons developed in detail hereinafter, the shift in the auxiliary box is preferably made partially or fully automatically by a standard power cylinder properly responsive to movement of the main shift lever. Thus, such an arrangement permits the accomplishment of the double shift with one hand.

It will be understood that means other than those herein specifically shown for actuating the auxiliary box upon the attainment of a neutral position by the main box will be apparent to persons acquainted with equipment of this type, so that the substitution of such equivalent elements will not constitute a departure from this invention. Also, under some circumstances and in different but frequently equivalent embodiments, it will be possible and desirable first to effect a shift of the auxiliary box into neutral and then effect a shift of the main box. This variation in sequence in the manner of accomplishing a desired shift is well within the broad concept of this invention, particularly as it refers to a method for shifting of transmission gears as distinguished from the physical embodiment itself.

Accordingly, a major object of this invention is to provide a multiple speed transmission assembly as of the unit and auxiliary type, which an operator can shift through its entire shift range by the use of only one hand.

A further object of this invention is to provide a multiple speed transmission assembly, as aforesaid, having a relatively large number of forward speeds and capable of heavy service, such as in large trucks.

A further object of the invention is to provide a multiple speed transmission assembly, as aforesaid, which can be shifted more easily than prior known transmissions of this type.

A further object of the invention is to provide a multiple speed transmission assembly, as aforesaid, wherein the simultaneous shift of the main transmission box and the auxiliary transmission box is necessary only after a portion or all of the ratios in the main transmission have been shifted.

A further object of the invention is to provide a multiple speed transmission assembly, as aforesaid, wherein the shift of the auxiliary box during said simultaneously shift may be easily performed by semiautomatic means at the will of the operator, thereby necessitating the direct manual shifting of only the main box.

A further object of the invention is to provide a multiple speed transmission assembly, as aforesaid, wherein the auxiliary box is semiautomatically shifted at the will of an operator when, but only when, the associated main box is in neutral position.

A further object of the invention is to provide a multiple speed transmission assembly, as aforesaid, having means preselectable by an operator which will automatically shift said auxiliary box when, but only when, the shift rods of the main box next enter into the neutral position.

Other objects and purposes of this invention will become evident to those acquainted with this general type of equipment upon reading the following description and inspecting the accompanying drawings.

It will be understood that the principles and purposes of this invention may also be practiced by other mechanisms which will be quickly apparent to persons familiar with equipment of this general type upon their understanding the hereinafter disclosure. Accordingly, it should be understood that the particular embodiment illustrated, and hereinafter described, should be taken as illustrative only of the principles of my invention and in no sense as limiting.

For illustrations of a preferred embodiment of the invention, reference is made to the drawings in which:

Figure 1 is a central cross-sectional view of a transmission assembly, to which this invention relates, taken along a substantially vertical plane through the axes of the main gear shafts of both the main and auxiliary transmission boxes and indicated by the line I—I in Figure 2.

Figure 2 is a sectional view of the main box taken along the line II—II of Figures 1 and 3.

Figure 3 is a sectional view of said transmission assembly taken substantially along the line III—III of Figure 2, rotated 90° clockwise and showing a portion of the main box output shaft in broken lines.

Figure 4 is a diagrammatic view of said transmission assembly showing the gears of the main box in over-drive or fifth gear and the gears of the auxiliary box in direct drive.

Figure 5 is a diagrammatic view of the said transmission assembly showing the gears of the main box in a direct drive or fourth gear and the gears of the auxiliary box is reduced drive.

Figure 6 is a diagrammatic view of said transmission assembly showing the gears of the main box in third gear.

Figure 7 is a diagrammatic view of said transmission assembly showing the gears of the main box in a second gear.

Figure 8 is a diagrammatic view of said transmission assembly showing the gears of the main box in first gear.

Figure 9 comprises a sectional view of Figure 1 taken along the line IX—IX and a partially diagrammatic showing of a device for shifting said auxiliary box.

Figure 10 is a sectional view taken along the line X—X of Figure 9.

Figure 11 is a sectional view taken along the line X—X of Figure 9 with one shift rod out of the neutral position.

CONSTRUCTION

As shown in Figure 1, the multiple speed transmission assembly 13, to which this invention relates, is comprised in a preferred, illustrative, embodiment of a main transmission box 10, an auxiliary transmission box 11, and an auxiliary actuating section 12. Power means (not shown), such as a conventional diesel or gasoline engine, may be provided to drive the transmission assembly 13.

*The main box*

Since this invention lies in the association and coaction of the main box and the auxiliary box, and not in the specific construction by itself of either of these boxes, the following description of the main box shall be understood as given by way of example only and is not to be considered limiting.

The main box may in general be any device comprising an assemblage of gears capable of being shifted to effect two or more different power transmission ratios wherein there exists a mainshaft carrying thereon one or more gears normally rotatable with respect thereto but arranged for selective positive clutching to said main shaft to effect ratio changes.

For the purpose of convenient in description, the terms "leftwardly" and "rightwardly," as used in this specification, will be understood to mean leftwardly and rightwardly with respect to the transmission assembly 13 when positioned as appearing in Figure 1. The terms "inwardly" and "outwardly" shall be understood to have reference to the geometric center of the transmission assembly 13 or the sections 10, 11 and 12, thereof. The terms "upper" or "upwardly" and "lower" or "downwardly" shall be understood to refer to the assembly 13 when positioned and/or operating in its normal manner of use.

With specific reference now to the main box here selected for illustrative purposes, the main transmission box 10 is provided with a centrally disposed main shaft 14 and an input shaft 15, which shafts are preferably coaxial, with their adjacent ends closely spaced from each other within the main transmission section 19. The main shaft 14 is rotatably supported upon the main bearings 16, 16a and 16b within the main box 10 and the pilot bearing 17, said pilot bearing being mounted in and upon the adjacent end of the input shaft 15. The input shaft 15 is rotatably supported in one end of the main box 10 by means of the main bearing 18. The leftward end of the input shaft 15 is splined for conventional coupling usually through a clutch with said power means and is supported by a clutch pilot bearing (not shown).

The leftward end of the main shaft 14 is splined for axially movable support of the clutch member 23 having leftward and rightward sets of external teeth 24 and 25, respectively. The clutch member 23 is provided with a circumferential groove 26 between said teeth for engagement by a clutch fork 27, which fork is actuable by a shift lever 22 in a conventional manner.

The rightward end of the input shaft 15 is provided with an input gear 28 having internal and external teeth 29 and 31, respectively. The internal teeth 29 of the input gear 28 are engageable by the leftward teeth 24 of the clutch member 23 when said clutch member is in its leftward position upon the splined portion of the main shaft 14.

A small floating gear 32, which is rotatably supported upon the main shaft 14 adjacent to the clutch member 23, is provided with external teeth 34 and internal teeth 33 selectively engageable by the rightward teeth 25 of said clutch member 23.

A medium floating gear 35 is rotatably supported upon the main shaft 14 adjacent to the rightward side of said floating gear 32 and is provided with clutch teeth 36. A shaft gear 37 is positioned adjacent to said clutch teeth 36. A ring gear 38, having external teeth 39, is provided with internal teeth 41 whereby said ring gear is supported upon and engaged by the shaft gear 37 and is axially movable leftwardly and rightwardly with respect thereto. The ring gear 38 is provided with a circumferential groove 42 engageable by a clutch fork 43 which clutch fork is actuable by means of the shift lever 22 in a conventional manner.

A large floating gear 44, having clutching teeth 45, is rotatably supported upon the main shaft 14 adjacent to the rightward side of the shaft gear 37.

The rightward end 46 of the main shaft 14 is splined in a conventional manner and extends through the rightward end of the main box 10 into the auxiliary box 11. A second ring gear 47 has an internally splined, centrally disposed, opening for support upon and engagement with the splined rightward end of the main shaft 14, and is disposed adjacent to the rightward side of the main bearing 16.

A main output gear 48, having external teeth 49, internal teeth 51 and being within the auxiliary transmission box 11, is provided with a hub 52 which is internally splined for engagement with the rightward end 46 of the mainshaft 14. The main bearings 16a and 16b encircle the hub 52 for support thereof. A pilot bearing 53 is mounted substantially within the rightward side of the output gear 48 for rotatable support of the leftward end of the auxiliary main shaft 54 hereinafter described.

A main countershaft 55 is rotatably supported within the main box 10, preferably directly below the main shaft 14 and parallel therewith, by the bearings 56 and 56a. A spur gear 57 is secured to the countershaft 55 adjacent to the bearing 56 for continuous engagement with the external teeth 31 of the input gear 28. A small spur gear 58 is secured to the countershaft 55 adjacent to the rightward side of said gear 57. A medium spur gear 59 is secured to the countershaft 55 adjacent to the rightward side of the small spur gear 58 for continuous engagement with the external teeth 34 of the small floating gear 32. A large countershaft gear 61 is secured on the countershaft 55 in continuous engagement with the medium floating gear 35.

A small countershaft gear 62 is secured to said countershaft 55 rightwardly from the large countershaft gear 61 and is continuously engageable with the large floating gear 44.

A countershaft floating gear 63, having external teeth 64 and internal teeth 65, is rotatably supported upon the countershaft 55 adjacent to the rightward side of the bearing 56a.

The rightward end of the countershaft 55 is splined in a conventional manner. A clutch member 66, having a circumferential groove 67, is provided with an internally splined, centrally disposed opening for axially slidable support of the member upon the splined rightward end of the countershaft 55. The clutch member 66, which is adjacent to the floating gear 63, has external teeth engageable by the internal teeth 65 of the said floating gear 63. The circumfertial groove 67 is engaged by a clutch fork 68 which is actuable by the clutch lever 22 in a conventional manner. The external teeth 64 of the floating gear 63 are continuously engageable by and with the second ring gear 47.

A reverse idler shaft 69 (Figure 3) is secured within the main transmission box 10, is disposed parallel with the countershaft 55, and is spaced substantially horizontally therefrom. Since it is provided with conventional gearing and operated in a conventional manner, detailed description thereof is considered unnecessary and is accordingly omitted.

The auxiliary box

While a wide variety of specific gear structures, including planetary, may be utilized in the auxiliary box, the hereinafter described construction has been found satisfactory and will be described in detail for illustrative purposes. However, whatever specific arrangement is utilized, it will usually provide two ratios of power transmission which ratios differ by an amount normally equal to the entire range of the main box plus about one half step. Alternatively, however, the auxiliary box ratios may differ by an amount equal to, or a little greater than, some selected portion of the main box gears.

The auxiliary main shaft 54 is disposed within the auxiliary box 11 and is coaxial with the main shaft 14. Its leftward end is supported by the bearing 53 and a point near its rightward end is supported by the bearing 89. The extreme rightward end of the auxiliary shaft 54 is splined in a conventional manner for engagement with a propeller shaft 90 by means of any conventional, convenient, coupling 91. A clutch sleeve 81 is slidably supported upon the auxiliary shaft 54 adjacent to the main output gear 48 and is engaged for rotation therewith by suitable splining.

The clutch sleeve 81 is provided with leftward and rightward rings of external teeth 82 and 83, respectively, adjacent to the axial faces thereof, and a circumferential groove 84 is disposed intermediate the rings of teeth. The circumferential groove 84 is engaged by a clutch fork 85, secured to a semiautomatic shifting device, hereinafter described in detail, for reciprocable movement of the clutch sleeve 81 on the auxiliary shaft 54. The leftward teeth 82 of the clutch sleeve 81 are controllably engageable with the internal teeth 51 of the main output gear 48, such control being effected by the synchronizing clutch 79 when the clutch sleeve 81 is moved leftwardly along the auxiliary main shaft 54. An auxiliary output gear 86, which is rotatably supported upon the auxiliary main shaft 54 adjacent to the rightward side of clutch sleeve 81, is provided with internal teeth 87 and external teeth 88. The rightward ring of teeth 83 on the clutch sleeve 81 is controllably engageable with the internal teeth 87 of the output gear 86, said control being effected by the synchronizing clutch 80 when the clutch sleeve 81 is moved rightwardly along the auxiliary main shaft 54.

The synchronizing clutches 79 and 80, may be of any convenient and conventional type, such as the cone clutch disclosed and described in Patent No. 2,463,155. Hence, detailed description thereof is omitted here.

It will be understood that the capacity of these synchronizers must be sufficient to effect synchronization, and consequent completion of the auxiliary shift, during the time the shift lever is passing through neutral position at a relatively rapid rate, and preferably during the first half of such passage, having in mind that the entire shift will normally take about 0.6 second on an upshift and about 1.8 seconds on a downshift. Thus, synchronization and completion of the auxiliary shift will preferably be completed in substantially less than 0.5 second and to accomplish this the synchronizers must be of relatively large capacity.

An auxiliary countershaft 92 (Figure 1) which is preferably parallel with the auxiliary main shaft 54 and spaced downwardly therefrom, is rotatably supported at its extremities within the auxiliary box 11 by the bearings 93 and 93a. A large gear 94 is supported upon the auxiliary countershaft 92 near its leftward end for rotation therewith and continuous engagement with the external teeth 49 of the main output gear 48. A pinion gear 95 is supported upon the auxiliary countershaft 92 near its rightward end for rotation therewith and continuous engagement with the external teeth 88 of the auxiliary output gear 86.

Thus, in this embodiment, the auxiliary box 11 is provided with gears effecting a direct drive and a reduction gear ratio. The difference between the direct drive and reduction drive ratios of the auxiliary box in this embodiment of the invention is approximately one half step greater than the entire speed range between first and fourth gear ratios provided in the main box 10.

The following table discloses in detail the gear ratios used in this embodiment and which have been found to operate satisfactorily in the main transmission box of a unit and auxiliary transmission assembly of an otherwise conventional truck:

| Gear Position | Gear Ratio | Differential Between Gear Ratios |
| --- | --- | --- |
| First | 2.58 | 1.41 |
| Second | 1.833 | 1.4 |
| Third | 1.318 | 1.318 |
| Fourth (direct) | 1.00 | 1.34 |
| Fifth (over-drive) | .749 | |

The reduction drive gear ratio in the auxiliary box, for use with the above ratios in the main box, was found to be satisfactory at 3.33. Accordingly, the following table discloses the entire range of gear ratios available in this particular embodiment of the transmission assembly:

| Transmission Position | Main Box Position | Auxiliary Box Position | Over-All Position |
| --- | --- | --- | --- |
| 1 | first | reduction | 8.59 |
| 2 | second | do | 6.11 |
| 3 | third | do | 4.39 |
| 4 | fourth (direct) | do | 3.33 |
| 5 | first | direct | 2.58 |
| 6 | second | do | 1.833 |
| 7 | third | do | 1.318 |
| 8 | fourth | do | 1.00 |
| 9 | fifth (over-drive) | do | .749 |

It will be understood that the above description of the main transmission box 10 and auxiliary transmission box 11 is given in detail for illustrative purposes, only, and it is not intended that the specific details thereof impose any limitation upon the scope of the invention.

*Auxiliary box actuating means*

The means for actuating the auxiliary box may be any of a wide variety of power devices effective to move the shiftable member of the auxiliary box, when, and only when, the operator moves a suitable pre-selecting device and the main box thereafter comes into neutral position. The operating parts may be placed anywhere which is convenient and consistent with their effective operation. The specific device hereinafter described will illustrate one effective embodiment.

As shown in Figures 1 and 9, the auxiliary box actuation section 12 is preferably mounted on, or adjacent to, the auxiliary transmission box 11 for semiautomatic actuation of the auxiliary clutch sleeve 81. The actuating section 12 contains an automatic control mechanism 99 comprising a double acting actuating cylinder 101, an actuation arm 100, and a two-way selector valve 102 of any conventional type, which is connected in a conventional manner by means of pipes 103 and 104 to said cylinder 101. Although the cylinder 101 is hereinafter described and disclosed as an air cylinder, which may be either pressure or vacuum, it will be understood that said cylinder may also be actuated hydraulically. A vacuum system is hereinafter assumed for illustrative purposes.

The selector valve 102 is in turn connected to a control valve 105 by means of the pipe 106. The control valve 105 may be of any convenient, conventional, type for controlling the passage of actuating fluid therethrough upon actuation of a control valve piston 107 extending therefrom. The control valve 105 is also connected to a vacuum tank 108, by means of the pipe 109. A spring 107a, encircling the piston 107, resiliently holds the piston 107 leftwardly in open position. The vacuum in the tank 108 may be maintained therein by the engine manifold, not shown, through the pipe 111 which communicates with the pipe 109 between the control valve 105 and the tank 108. A check valve 110 may be placed in the pipe 111 to retain the vacuum in tank 108 when the manifold pressure rises.

The selector valve 102 is connected by means of the cable 112 to a manually actuable preselector device 113 preferably disposed near, or on, the shift lever 22 of the main transmission box 10. Actuation of the device 113 will open and close the selector valve 102.

The shift rods 114, 115, 116 and 117, wherein, as is usual, only one shift rod is permitted to leave the neutral position at a time, are provided with a substantially conventional interlock mechanism 118.

This interlock mechanism is comprised of the circumferential grooves 119, 119a, 119b and 119c, around the shift rods 114, 115, 116 and 117, respectively. Cylindrical lock pins 121, 121a, and 121b are horizontally and slidably supported within appropriate openings 120, 120a and 120b through the shift rods 114, 115 and 116, respectively. The said openings are diametrically disposed within their respective shift rods, communicate between opposite sides of the circumferential grooves and are axially aligned with each other when the shift rods are in the neutral position. The lock pins, which are preferably identical, are equal in length to the diameter of said shift rods less the depth of the circumferential groove therein, and are preferably rounded at their axial extremities.

A plurality, here four, of lock balls 122, 123, 124 and 125 are disposed within a straight, normally horizontal, cylindrical channel 126 in the casing 127 surrounding the shift rods. The channel 126 is perpendicularly disposed with respect to the said shift rods, and aligned with the circumferential grooves 119, 119a, 119b and 119c when the shift rods are all in neutral position. The lock balls 123, 124 and 125 are disposed within the channel 126 between respective pairs of shift rods, and are engageable by the adjacent ends of the respective lock pins when they enter into the respective circumferential grooves. The ball 122 is positioned within the channel 126 between the adjacent end of the piston 107 and the shift rod 114, is engageable by the adjacent end of the lock pin 121, and is receivable within the groove 119. The piston 107 of the control valve 105, which valve is mounted upon the casing 127, is resiliently held in continuous engagement with the lock ball 122. The shift rods 114, 115, 116 and 117 may be otherwise constructed, mounted within the casing 127, and connected with the gearing therein in a conventional manner.

The lock pins and lock balls are so designed that when any one shift rod, such as the shift rod 115 (Figure 1) is moved out of the neutral position, the lock pins and/or the lock balls on the rightward side thereof are urged rightwardly, thereby depressing the piston 107 and closing the valve 105. As soon as the shift rod 115 is returned to the neutral position, the lock balls 122 and 123, and the lock pin 121 (Figure 10) will return leftwardly under the urging of spring 107a, thereby permitting a leftward movement of the piston 107 which opens the control valve 105.

It will be noted (Figures 10 and 11) that, since the ball 123 begins to move leftwardly slightly before the shift rod 115 reaches exact neutral, action of the cylinder 101, hence shifting the auxiliary box 11, also may begin before the shift rod 115 reaches exact neutral. Therefore, by the time that the lock ball 123 is firmly seated in the circumferential groove 119a, the synchronization between the clutch sleeve 81 and the auxiliary output gear 86 is well under way.

OPERATION

Main and auxiliary transmission assemblies

Since the operation and structure of the several gears within the transmission assembly 13 may be conventional, specific details relating thereto have been omitted from this specification.

Figure 4 discloses diagrammatically the arrangement of the pertinent gears and shafts involved, both in the main box 10 and the auxiliary box 11 of the transmission assembly 13, when the gears of the main box are in the fifth, or over-drive gear position, and the gears of the auxiliary box are in the direct drive position.

Figure 5 discloses diagrammatically the arrangement of the pertinent gears and shafts of the transmission assembly 13 when the gears of the main box 10 are in direct drive and the gears of the auxiliary box 11 are in reduction drive.

Figure 5 discloses diagrammatically the arrangement of the pertinent gears and shafts of the transmission assembly 13 when the gears thereof are in third gear.

Figure 7 discloses diagrammatically the arrangement of the pertinent gears and shafts of the main box 10 of the transmission assembly 13 when the gears thereof are in second gear position.

Figure 8 discloses diagrammatically the arrangement of the pertinent gears and shafts in the main box 10 of the transmission assembly 13 when the gears thereof are in first gear position.

The other normal operating arrangements will be obvious from these illustrations without further elaboration.

The interengagement of the various corresponding gears within the transmission assembly 13, for the purpose of effecting the various above mentioned gear ratios, may be accomplished in a conventional manner by means of the shift lever 22 and the shift rods 114, 115, 116 and 117.

The clutch sleeve 81 in the auxiliary box 11 is moved axially along the auxiliary main shaft 54 (Figures 1 and 9) by means of the actuating arm 100 of the air cylinder 101 acting through the clutch fork 85. When the clutch sleeve 81 is in the leftward position (Figure 9) it engages the output gear 48, thereby effecting a direct drive through the auxiliary box 11. When the clutch gear 81 is in the rightward position (Figure 1), it engages the auxiliary output gear 86, thereby effecting a reduction drive through the auxiliary box 11. The synchronizing clutches 79 and 80 provide means for reducing the speed of the main shaft 14 prior to engagement between the clutch sleeve 81 and the main output gear 48, in a conventional manner, and for speeding up the main shaft 14 and auxiliary countershaft 92 prior to engagement between the clutch sleeve 81 and the auxiliary output gear 86, also in a conventional manner.

OPERATION

Auxiliary box shift actuator

As mentioned above, it is necessary that the shift in the auxiliary box 11 be made very quickly in order that it be completed before the speed of the power means driving the transmission assembly 13 has retarded excessively. Since this normally requires less than a second, the need for a rapid shift is apparent.

To shift the clutch sleeve 81 in the auxiliary box 11, the manual preselector device 113 operating through the cable 112 is actuated, thereby changing the position of the selector valve 102. If, when this is done, all of the shift rods are in neutral position and the valve 105 is accordingly in open position, pressure fluid is immediately conducted from one end of the pressure cylinder through the pipes 106 and 109, while pressure fluid, here atmospheric air, is admitted into the opposite end of the cylinder, thereby causing an axial movement of the actuating arm 100 and the clutch fork 85 secured thereto in a conventional manner. If one of the shift rods is out of neutral position when the preselector device 113 is actuated, the valve 105 will be closed and the shift of the auxiliary box will not be accomplished until this shift rod is returned to the neutral position, but upon such return, the valve 105 will open and the above described axial movement of the clutch fork 85 will take place at once.

The first reaction to movement of the clutch sleeve 81 is a synchronization of the clutch sleeve rotational speed with the speed of either the main output gear 48 or auxiliary output gear 86 by means of the synchronizing clutches 79 or 80, respectively, depending upon which way the clutch sleeve 81 is being moved. When this synchronization has been accomplished, the clutch sleeve 81, under the continuing urging of the pressure fluid, shifts the auxiliary box from one of its two gear positions to the other. The main box 10 can then be shifted by means of the shift lever 22 into a new gear position as soon as said synchronism is effected whether or not the clutch sleeve 81 has actually completed its shift.

For more specific illustration, a shift sequence involving a double shift will now be traced in detail. The main box will be assumed to be in direct drive and the auxiliary box in reduction and it is desired to shift to the next higher speed.

With the main box in direct drive, the shift rod 115 is displaced leftwardly, as appearing in Figure 1, out of the neutral position. With the auxiliary box in reduction drive, the actuating arm 100 of the pressure cylinder 101 is extended, as shown in Figure 1. The control valve 105 is closed, and there is a vacuum within the rightward end of the air cylinder 101 and atmospheric pressure at the leftward end of the air cylinder 101. The preselector device 113 is moved by the operator while the main box is still in direct drive, thereby changing the position of the selector valve 102 so that atmospheric pressure is admitted to the rightward end of the air cylinder 101 and so that there is an open passageway from the leftward end of the pressure cylinder 101 through the pipe 103, the selector valve 102 and the pipe 106 to the control valve 105.

As soon as the shift rod 115 is moved into neutral position by the shift lever 22, the lock ball 123 begins to move into the circumferential groove 119a in the shift rod 115 and the piston 107, which is being urged outwardly of the control valve by the spring 107a, moves leftwardly. Such movement of piston 107 opens the control valve 105 thereby permitting the release of the pressure fluid from the leftward end of the pressure cylinder 101 through the pipes 103, 106, and 109 into the vacuum tank 108. Atmospheric air admitted to the rightward end of said pressure cylinder 101 then urges the arm 100 leftwardly. This first effects synchronization of the clutch teeth 51 and 82 and then effects engagement thereof as soon as synchronization is substantially completed. This shift will usually require about 0.6 second of which the greater part is required to effect synchronization. Thus, since the shifting of the auxiliary box is effected automatically, and as quickly as the usual double clutching operation can take place, the operator need not, and should not, await the sounds advising him of completion of the auxiliary shift before completing the main box shift but should instead move the shift lever through its usual shift pattern at a normal rate and without regard to the auxiliary box. With synchronizing of the auxiliary gears accomplished shifting of the main box may proceed even though actual shifting of the back box may not yet be completed.

In carrying forward the shifting of the main box, the next shift rod normally engaged after the shift rod 115 is moved into neutral, is the shift rod 116. When the shift rod 116 is moved rightwardly, as appearing in Figure 1, the shift fork 43 secured thereto effects an engagement between the ring gear 38 and the large floating gear 44, thereby placing the main box in first gear (Figure 8). First gear in the main box coupled with direct drive in the auxiliary box (Figures 4 and 9) permits a half step increase in output speed to the propeller shaft 90 over the direct drive position in the main box coupled with the reduction drive in the auxiliary box, in this particular embodiment of the invention.

In the downshift progression, there is a corresponding double shift and this is carried out in a manner corresponding to that just described for the upshift double shift.

OPERATION

Entire assembly

For low gear in the main box, and reduction position in the auxiliary, the main box is shifted through all of its ratios to direct drive without change in the auxiliary box. This effects a series of steps equivalent to present half steps without requiring any double shifts, and completes approximately one half of the entire transmission range.

Next, to continue the upshift progression, the main box must be returned to low gear and the auxiliary shifted from reduction to direct drive. This is accomplished as described in the preceding section.

The remainder of the upshift is then effected by the shifting of the main box again through all of its steps. Thus, there is effected an upshift progression in half step increments throughout the entire shift range requiring only one double shift and requiring the use of only one hand by the operator.

The downshift progression is substantially a reversal of the above described upshift procedure.

CONCLUSION

While the foregoing has assumed throughout that the ratio in the auxiliary box would be approximately one half step greater than the whole range of the main box (excluding over-drive) it should be understood that in some instances it might be preferable to have the auxiliary box range of ratios thus bracket only part of the gear ratios in the main box. In any case, however, the ratio in the auxiliary box will be slightly greater than the difference in ratios of the gears of some selected portion of the main box. Further, it has been assumed that there will be only two ratios in the auxiliary box, but it will be evident that the principles of the invention may be also applied with three or more ratios in the auxiliary box to secure a very great total range for the entire transmission.

While the specific embodiment herein utilized for illustrative purposes comprises a main box and an auxiliary box as separate units, it will be appreciated that the invention can as well be housed in a single box. Hence, the terminology "main box" and "auxiliary box," or "main transmission" and "auxiliary transmission," in the appended claims shall be understood to be used for convenience only in referring to certain gear groupings and not as any limiting requirement that the gear groupings be located in different, separable, housings.

Thus, we have disclosed an improved transmission assembly which substantially reduces the number of double shifts required throughout the range of the shift progression as compared with similar assemblies presently in use. Our transmission assembly also, in effect, transfers most of the shifting from the auxiliary box to the main box and provides means for shifting the auxiliary semiautomatically. The invention further provides means whereby the semiautomatic double shift of both the main box and auxiliary box can be accomplished more swiftly and accurately than previously possible in transmission assemblies presently known to exist.

Although the above mentioned drawings and description apply to one particular preferred embodiment of our invention, it is not our intention, implied or otherwise, to eliminate other variations or modifications which do not depart from the scope of the invention unless specifically stated to the contrary in the hereinafter appended claims.

We claim:

1. In a multiple change speed gearing assembly having a plurality of shift rods and means permitting only one shift rod at a time out of neutral position; the combination comprising: a first change speed gear group having a set of change speed gears controlled by said shift rods for effecting a plurality of successive gear ratios; a second change speed gear group coupled in series with the first gear group and having change speed gears effecting a pair of gear ratios whose speed differential is approximately one half step greater than the speed range of a selected portion of the first gear group; controllable means for automatically shifting the second gear group; a pair of control means for said controllable means in series with each other, one thereof being manually preselectable into and out of shift effecting position and the other thereof being actuable to its position for effecting shifting each time said first change speed gear group is in substantially neutral position; whereby upon appropriate preselection of said one control means said second gear group will shift immediately upon the entry of the first change speed gear group into neutral position.

2. In a unit mounted and auxiliary transmission, the combination comprising: a main transmission box having main change speed gearing, shiftable gears therein arranged for successive speed ratios; an auxiliary transmission box connected in series with said main transmission box and having auxiliary, change speed gearing, wherein the differential in speed ratios between the sets of said auxiliary change speed gearing is approximately one half step greater than the sum of the differentials in speed ratios between a selected portion of the main change speed gearing, said portion comprising more than two successive ratio positions of said main gearing; operating means effecting shifting of said auxiliary gearing when, and only when, said main change speed gearing is in neutral position; manually controlled preselectable means rendering said operating means operable and inoperable at the will of an operator; whereby actuation of said preselectable means, followed by return of the main box to neutral, at the end of a shift progression through the ratios of said preselected portion of main gears effects an automatic shift of the auxiliary transmission.

3. In multiple change speed gearing, the combination comprising: a main gear group having a range of speed ratios approximately equal to one half the range of speed ratios in the entire device; an auxiliary gear group having high and low speed ratios wherein the speed differential is approximately equal to the range of speed ratios in the main group; and operating means for shifting the auxiliary group immediately upon the main group's entering into the neutral position; manually controlled preselectable means rendering said operating means operable and inoperable at the will of an operator; whereby actuation of said preselectable means, followed by return of the main group to neutral, at the end of a shift progression through the ratios of the main gears effects an automatic shift of the auxiliary gear group.

4. In a multiple speed, heavy duty transmission, the combination comprising: a main gear group having a range of gear ratios approximately equal to one half the range of the entire transmission and operable by a shift lever; and an auxiliary gear group connected in series with said main gear group and having gears with synchronizers therebetween and providing direct and reduction ratios approximately equal to the entire range of the main gear group, and operating means for automatically shifting the auxiliary gear group immediately when the main gear group enters into neutral position; manually controlled preselectable means rendering said operating means operable and inoperable at the will of an operator; the time of commencing the auxiliary shift and the capacity of the synchronizers being such, that the shift of the auxiliary gear group can be completed during a continuous motion of the shift lever at a normal rate through neutral position, whereby actuation of said operating means, followed by return of the main gear group to neutral at the end of a shift progression through the ratios of the main gear group, effects an automatic shift of the auxiliary transmission.

5. In a multiple speed, heavy duty transmission, as for trucks, the combination comprising: a main change speed gear group having a range of gear ratios not greater than one half the range of gear ratios in the entire transmission and operable by a shift lever; an auxiliary change speed gear group connected in series with said main change speed gear group and having gears with synchronizers therebetween for providing direct and reduction gear ratios wherein the differential in gear ratios is not less than the entire range of gear ratios in the main group; means for automatically shifting the auxiliary gear group at the will of an operator but only when the main gear group enters into neutral position, said means including a source of energy and first and second control elements in series, said first element being actuated to position for shifting the auxiliary gear group each time the main gear group enters into neutral position and said second element being manually actuable to its position for effecting a shift of the auxiliary gear group, the time of commencing the auxiliary shift and the capacity of the synchronizers being such that the shift of the auxiliary gear group can be completed during a continuous motion of the shift lever at a normal rate through neutral position; whereby actuation of said second control element, followed by return of the main gear group to neutral at the end of a shift progression through the ratios of the main gears, effects an automatic shift of the auxiliary gear group.

6. In a multiple speed transmission, as for trucks, the combination comprising: a main change speed gear group wherein the entire range of gear ratios totals not more than approximately one half the range of the entire transmission and operable by a shift lever; an auxiliary change speed gear group having gears with synchronizers therebetween and providing direct and reduction gear ratios wherein the differential between said direct and reduction ratios is approximately equal to the entire range of the main gear group plus the difference between a pair of successive gear ratios in said main gear group; and means including a source of fluid pressure and a pair of control valves connected in series, for shifting the auxiliary change speed gear group when, and only when, the main change speed gear group enters into neutral position, one of said valves being automatically opened each time the main gear group enters into neutral position and the other valve being manually openable at the will of an operator, the time of commencing the auxiliary shift and the capacity of the synchronizers being such that the synchronization of the auxiliary box can be substantially completed during a continuous motion of the shift lever at a normal rate through the first half of its neutral position; whereby actuation of said other valve means, followed by return of the main gear group to neutral at the end of a shift progression through the ratios of the main gears, effects an automatic shift of the auxiliary gear group.

7. In a multiple speed, heavy duty, automotive transmission, as for trucks, the combination comprising: a main gear set having therein main shiftable gears, operable by a shift lever, and support means therefore, said gears being arranged both in number and magnitude of ratio change to provide a range of ratio change less than the ratio range of the entire transmission, and said support means for said gears including a main shaft and a countershaft and said main shaft gears being driven by the main shaft; an auxiliary gear set connected in series with said main gear set having therein auxiliary, shiftable gears providing two auxiliary speed ratios, and including synchronizers between pairs of auxiliary gears, the differential between said auxiliary ratios being not less than the total ratio change available from a selected portion of the gears in the main gear set; means including a pair of control elements in series including a pair of control elements in series for automatically shifting the auxiliary gear set, at the will of an operator but only when the main gear set enters into neutral position, said means including a pair of control elements in series, a source of energy and one of said elements being automatically moved into position for shifting the auxiliary gear set each time the main gear set enters into neutral position and the other element being manually movable at the will of the operator into position for shifting the auxiliary gear set, the time of commencing the auxiliary shift and the capacity of the synchronizers being such that the synchronization of the auxiliary gear set can be substantially completed during a continuous motion of the shift lever at a normal rate through the first half of its neutral position; whereby actuation of said other element followed by return of the main gear set to neutral at the end of a shift progression through the ratios of the main gear set effects an automatic shift of the auxiliary gear set.

8. In a multiple speed, heavy duty, automotive transmission, as for trucks, the combination comprising: a main housing having therein main change speed gearing, operable by a shift lever, and support means therefore said gears being arranged both in number and magnitude of ratio change to provide a range of ratio change less than the ratio range of the entire transmission, and said support means for said gears including a main shaft and countershaft and said main change speed gearing being driven by the main shaft of the main housing; an auxiliary housing having therein auxiliary change speed gearing connected in series with said main change speed gearing providing two auxiliary speed ratios and including synchronizers between pairs of auxiliary gears, the differential between said auxiliary ratios being not less than the total ratio change available from a selected portion of the gears in the main housing; means, including a source of fluid pressure and a pair of control valves connected in series for shifting the auxiliary transmission when, and only when, the main transmission enters into neutral position, one of said valves being automatically opened each time, and as soon as, the main transmission enters into neutral position and the other valve being manually openable at the will of an operator, the time of commencing the auxiliary shift and the capacity of the synchronizers being such that the shift of the auxiliary change speed gearing can be completed during a continuous motion of the shift lever at a normal rate through neutral position; whereby actuation of said other valve followed by return of the main change speed gearing to neutral, effects an automatic shift of the auxiliary transmission.

9. In a change speed transmission for a vehicle the combination comprising: a first change speed gear section having a pair of shafts and gears thereon providing a plurality of speed ratios; a second change speed gear section connected in series with said first section and having at least two speed ratios, means including a pair of friction clutches associated with said second section for connecting one of said shafts through a selected ratio in said second section to the output of said transmission; manually preselectable means, and means responsive both to the position of said first section and to one position of said preselectable means for effecting said connecting while the gears of said first section are in neutral position; whereby said connection of said one shaft to said output will utilize the vehicle inertia to affect the speed of rotation of said one shaft in such a direction and to such an extent as to facilitate completion of a shift in said first section.

10. In a change speed transmission for a vehicle the combination comprising: a first change speed gear section having a pair of shafts, including a main shaft, and gears thereon providing plurality of substantially equally spaced speed ratios; a second change speed gear section connected in series with said first section and having at least two speed ratios, said ratios being spaced apart an amount greater than the spacing of the ratios in said first section; means including a pair of friction clutches associated with said second section for connecting the input of said second section through a selected ratio in said second section to the output of said transmission; preselectable means and means responsive both to the position of said first section and to one position of said preselectable means for effecting said connecting substantially immediately upon the gears of the first section reaching neutral position; whereby during simultaneous, oppositely directioned substantially equal shifts of said first section and said second section, the connection of said main shaft to said section section output will utilize the vehicle inertia to affect the speed of rotation of said main shaft in such a direction and to such an extent as to facilitate completion of a shift in said first section.

11. In a change speed transmission for a vehicle the combination comprising: a first change speed gear section having a main shaft and a countershaft and gears thereon providing a plurality of substantially equally spaced speed ratios; a second change speed gear section in series with said first section and having at least two speed ratios, said ratios being spaced apart an amount greater than the spacing of the ratios in said first section; means including a pair of friction clutches associated with said second section for connecting said main shaft through a selected ratio in said second section to the output of said transmission; preselectable means and means responsive both to the position of said first section and to one position of said preselectable means, for effecting said connecting while the gears of said first section are in neutral position; whereby during simultaneous, oppositely directioned substantially equal shifts of said first section and said second section, the connection of said main shaft to said second section output will utilize the vehicle inertia to affect the speed of rotation of said main shaft in such a direction and to such an extent as to facilitate completion of a shift in said first section.

12. In a change speed transmission for a vehicle the combination comprising: a first change speed gear section having a main shaft and a countershaft and gears thereon providing a plurality of substantially equally spaced speed ratios; a second change speed gear section connected to the driven end of, and in series with said first section and having at least two speed ratios, said ratios being spaced apart an amount greater than the spacing of the ratios in said first section; means including a pair of friction clutches associated with said second section for connecting said main shaft through a selected ratio in said second section to the output of said transmission; means operable to effect said connecting immediately upon entry of said first section into neutral position from any gear ratio position; manually actuable means actuable independently of the position of said first change speed gear section for rendering said last named means operable or inoperable; whereby during simultaneous, oppositely directioned substantially equal shifts of said first section and said second section, the connection of said main shaft to said second section output will utilize the vehicle inertia to affect the speed of rotation of said main shaft in such a direction and to such an extent as to facilitate completion of a shift in said first section.

13. In a multiple speed, heavy duty, automotive transmission, as for trucks, the combination comprising: a main housing having therein main change speed gearing, operable by a shift lever, and support means therefor said gears being arranged both in number and magnitude of ratio changes, to provide a range of ratio change less than the ratio range of the entire transmission, and said support means for said gears including a main shaft and countershaft and said main change speed gearing being driven by the main shaft of the main housing; an auxiliary housing having therein auxiliary change speed gearing connected in series with said main change speed gearing providing two auxiliary speed ratios and including synchronizers between pairs of auxiliary gears, the differential between said auxiliary ratios being not less than the total ratio change available from a selected portion of the gears in the main housing; means, including a source of energy and a pair of control means connected in series and to said source of energy, for shifting the auxiliary transmission when, and only when, the main transmission enters into neutral position, one of said control means being automatically actuated for effecting shifting each time, and as soon as, the main transmission enters into neutral position and the other control means being manually actuable for effecting shifting at the will of an operator, the time of commencing the auxiliary shift and the capacity of the synchronizers being such that the synchronization of the auxiliary change speed gearing can be completed during a continuous motion of the shift lever at a normal rate through neutral position; whereby actuation of said other control means, followed by return of the main change speed gearing to neutral, effects an automatic shift of the auxiliary transmission.

14. In a multiple speed, heavy duty, automotive transmission, as for trucks, the combination comprising: main change speed gears operable by a shift lever, and support means therefor, said gears being arranged both in number and magnitude of ratio change to provide a range of ratio change less than the ratio range of the entire transmission, and said support means for said gears including a main shaft and countershaft and said main change speed gears being driven by the main shaft; auxiliary change speed gears connected in series with said main change speed gears providing at least two auxiliary speed ratios, and including synchronizing means between pairs of auxiliary gears, the differential between said auxiliary ratios being not less than the total ratio change available from a selected portion of the main change speed gears; a source of energy and shift means utilizing same to shift said auxiliary gear ratios; manually controlled means actuable independently of the position of the first section for blocking and unblocking the flow of said energy to said shaft means; other means serially arranged with respect to said manually controlled means blocking and unblocking the flow of energy to said shift means automatically in response to the position of said main change speed gears; whereby after shifting of said auxiliary gear group subsequent ratios in the entire transmission may be established by further shifting of the main gears through the same pattern as was followed prior to shifting said auxiliary gear group.

15. In a change speed transmission for a vehicle, the combination comprising: a first change speed gear section having a main shaft and a countershaft and gears thereon providing a plurality of speed ratios; a second change speed gear section connected in series with said first section and having at least two speed ratios, means including a pair of friction clutches associated with said second section for connecting said main shaft through a selected ratio in said second section to the output of said transmission; manually preselectable means, and means responsive both to the position of said first section with respect to its neutral position and to one position of said preselectable means for effecting said connecting while the gears of said first section are in neutral position; whereby said connection of said main shaft to said output will utilize the vehicle inertia to affect the speed of rotation of said main shaft in such a direction and to such an extent as to facilitate completion of a shift in said first section.

16. In a change speed transmission for a vehicle the combination comprising: a first change speed gear section having a pair of shafts and gears thereon providing a plurality of speed ratios; a second change speed gear section connected in series with said first section and having at least two speed ratios, means including a pair of friction clutches associated with said second section for connecting one of said shafts through a selected ratio in said second section to the output of said transmission; a source of energy and shift means utilizing same to shift said auxiliary gear ratios; manually preselectable means blocking and unblocking the flow of said energy to said shift means; other means serially arranged with respect to said manually preselectable means automatically blocking and unblocking said flow of energy to said shift means in response to movement of the gears of said first section into and out of neutral position, said two last named means being so arranged with respect to each other that in one position of said manually preselectable means the gears of said second change speed gear section will automatically shift upon entry of said first change speed gear section into neutral position and in another position of said manually preselectable means, the gears of said second change speed gear section will not shift upon entry of said first change speed gear section into neutral position; whereby said connection of said one shaft to said output will utilize the vehicle inertia to affect the speed of rotation of said one shaft in such a direction and to such an extent as to facilitate completion of a shift in said first section.

17. In a change speed transmission for a vehicle, the combination comprising: a first change speed gear section having a pair of shafts and gears thereon providing a plurality of speed ratios; a second change speed gear section connected in series with said first section and having at least two speed ratios, means including a pair of friction clutches associated with said second section for connecting one of said shafts through a selected ratio in said second section to the output of said transmission; a source of energy and shift means utilizing same to shift the gears of said second section; manually selectable means blocking and unblocking the flow of said energy to said shift means; other means serially arranged with respect to said manually selectable means automatically blocking and unblocking said flow of energy to said shift means in response to movement of the gears of said first section into and out of neutral position; said two last named means being so arranged with respect to each other that in one position of said manually selectable means the gears of said second change speed gear section will automatically shift upon entry of said first change speed gear section into neutral position and in another position of said manually selectable means, the gears of said second change speed gear section will not shift upon entry of said first change speed gear section into neutral position; whereby said connection of said one shaft to said output will utilize the vehicle inertia to affect the speed of rotation of said one shaft in such a direction and to such an extent as to facilitate completion of a shift in said first section.

18. In a change speed transmission for a vehicle, the combination comprising: a first change speed gear section having a pair of shafts, and gears thereon providing a plurality of substantially equally spaced speed ratios; a second change speed gear section connected in series with said first section and having at least two speed ratios, said speed ratios being spaced apart an amount greater than the spacing of the ratios in said first section; means including a pair of friction clutches associated with said second section for connecting through a selected ratio in said second section to the output of said transmission; preselectable means and means activated by entering of the said first section into neutral position and also serially activated in response to one position of said preselectable means for effecting said connecting promptly upon the gears of the first section reaching neutral position; whereby during simultaneous, oppositely directioned substantially equal shifts of said first section and said second section, the connection of said main shaft to said second section output will utilize the vehicle inertia to affect the speed of rotation of said main shaft in such a direction and to such an extent as to facilitate completion of a shift in said first section.

19. In a multiple speed, heavy duty, automotive transmission, as for trucks, the combination comprising: a main housing having therein main change speed gearing, including a main shaft, operable by a shift lever, and support means therefor, said gears being arranged both in number and magnitude of ratios to provide a range of ratio change less than the ratio range of the entire transmission, and said support means for said gears including a main shaft and countershaft and said main housing being driven by the main shaft of the main housing; an auxiliary housing having therein auxiliary change speed gearing connected in series with said main change speed gearing providing two auxiliary speed ratios and including synchronizers between pairs of auxiliary gears, the differential between said auxiliary ratios being not less than the total ratio change available for the entire range of ratios in the main housing; means including a source of energy and a pair of control means connected in series and to said source of energy, for shifting the auxiliary gearing when, and only when, the main gearing enters into neutral position, one of said control means being automatically actuated for effecting shifting each time, and as soon as, the main transmission enters into neutral position and the other control means being manually actuable for effecting shifting at the will of an operator.

20. In multiple change speed gearing, the combination comprising: a main gear group having a range of speed ratios approximately equal to one-half the range of speed ratios in the entire device; an auxiliary gear group having high and low speed ratios wherein the speed differential is approximately equal to the range of speed ratios in the main group; and operating means for initiating the shifting of the auxiliary group immediately upon the main group's entering into the neutral position, manually controlled preselectable means rendering said operating means operable and inoperable at the will of an operator; whereby actuation of said preselectable means, followed by return of the main group to neutral, at the end of a shift progression through the ratios of the main gear group effects an automatic shift of the auxiliary gear group.

21. In a change speed transmission for a vehicle, the combination comprising: a first change speed gear section having a main shaft and a countershaft and gears thereon providing substantially equally spaced gear ratios, and a shift lever effecting changing thereof; a second change speed gear section connected in series with said first section and having at least two speed ratios, said ratios being spaced apart an amount equal to the ratio difference of a selected portion of the range in said first section plus a percentage increment thereof which is substantially equal to the percentage increment between ratios in said first section; means including a pair of friction clutches associated with said second section and operable in neutral position of said gears in said first section for connecting the output of said first section through a selected ratio in said second section to the output of said transmission; manually controlled means independent of said shift lever for effecting said connecting substantially immediately upon the gears of the first section entering into neutral position; whereby during simultaneous, oppositely directioned, substantially equal shifts of said first section and said second section, the connection of said main shaft through said pair of friction clutches to the output of said second section will utilize the vehicle inertia to affect the speed of rotation of the main shaft in such a direction and to such an extent as to reduce the effective shift required to be made in the first section by an amount equal to the ratio differences existing in the second section 22. In a change speed transmission for a vehicle, the combination comprising: a first change speed gear section having a pair of shafts and gears thereon providing a plurality of speed ratios; means including a shift lever for shifting the gears in said first change speed gear section; a second change speed gear section connected in series with said first section and having at least two speed ratios, said ratios being spaced apart an amount greater than the spacing of the ratios in said first section; normally inoperative means including a pair of friction clutches effective when operative for utilizing energy derivable from the vehicle propeller shaft for driving one shaft of said first section and changing the speed of said one shaft by an amount equal to the range of ratios in said second section and in a direction to reduce the effective shift required to be made in the first section; a pair of independent means serially arranged, one responsive to the control of an operator and the other actuated immediately as, and each time that, said first change speed gear section enters into its neutral position, for rendering operative said normally inoperative means; whereby during simultaneous, oppositely directioned, substantially equal shifts of said first section and said second section, the connection of said one shaft through said pair of friction clutches to the output of said second section will utilize the vehicle inertia to effect the speed of rotation of the one shaft in such direction and to such an extent as to reduce the effective shift required to be made in the first section by an amount equal to the ratio difference existing in the second section.

23. In a change-speed transmission for vehicles: a first change-speed section having a pair of shafts including an output shaft and gears on said shafts providing a plurality of spaced speed ratios stepped down in substantially equal percentages to provide a given range of speed change; a second change-speed section having an input shaft connected to the output shaft of said first change-speed section and having gearing providing two speed ratios stepped down an amount equivalent to said given range of speed change of said first change-speed section plus a down step giving a percentage down equal to the percentage change between ratios in said first change-speed section and in including synchronizers between pairs of gears in said second change-speed section; means including a source of energy and a pair of control means connected in series and to said source of energy for shifting the second change-speed section when, and only when, the first change-speed section enters into neutral position, one of said control means being automatically actuated for effecting shifting each time, and as soon as, the first change-speed section enters into neutral position and the other control means being manually actuable for effecting shifting at the will of an operator.

24. In a change-speed transmission for a vehicle the combination comprising: a first change-speed gear section having a pair of shafts and gears thereon providing a plurality of speed ratios, means for shifting gear ratios in said first change-speed gear section including a shifting member movable between engaged and neutral positions; a second change-speed gear section connected in series with said first section and having at least two speed ratios, means including a pair of friction clutches associated with said second section for connecting one of said shafts through a selected ratio in said second section to the output on said transmission; a power shifter operably connected to said second section for changing it from one gear ratio to another, a first control for said power shifter operably connected to control the supply of power thereto and operably connected to said shifting member of said first change-speed gear section for actuation by movement of said shifting member from an engaged to the neutral position to release the supply of power to said power shifter on such movement, and a second control for said power shifter independent of said first control but in series therewith and operably connected to control the supply of power to said power shifter and including a manually operable member to release the flow of power to said power shifter on manual operation whereby the operator of the transmission may control said second control at will whereby upon movement of said shifting member of said first change-speed gear section from engaged to neutral position and upon operation of said manually operable member of said second control, power will be supplied to said power shifter and one of the shafts of said first change-speed gear section may be connected through a selected ratio in said second section to the output of said transmission to utilize vehicle inertia to effect the speed of rotation of said one shaft in such a direction and to such an extent as to facilitate completion of a shift in said first section and substantially the entire time of shifting of said first section is available for synchronization.

25. In a change-speed transmission for a vehicle the combination comprising: a first change-speed section having a pair of shafts including an output shafts and gears on said shafts providing a plurality of spaced speed ratios stepped down in substantially equal percentages to provide a given range of speed change, means for shifting gear ratios in said first change-speed gear section including a shifting member movable between engaged and neutral positions; a second change-speed section having an input shaft connected to the output shaft of said first change-speed section and having gearing providing two speed ratios stepped down an amount equivalent to said given range of speed change of said first change-speed section plus a down step giving a percentage down equal to the percentage change between ratios in said first change-speed section; means including a pair of friction clutches associated with said second section for connecting one of said shafts through a selected ratio in said second section to the output on said transmission; a power shifter operably connected to said second section for changing it from one gear ratio to another, a first control for said power shifter operably connected to control the supply of power thereto and operably connected to said shifting member of said first change-speed gear section for actuation by movement of said shifting member from an engaged to the neutral position to release the supply of power to said power shifter on such movement, and a second control for said power shifter independent of said first control but in series therewith and operably connected to control the supply of power to said power shifter and including a manually operable member to release the flow of power to said power shifter on manual operation whereby the operator of the transmission may control said second control at will whereby upon movement of said shifting member of said first change-speed gear section from engaged to neutral position and upon operation of said manually operable member of said second control, power will be supplied to said power shifter and one of the shafts of said first change-speed gear section may be connected through a selected ratio in said second section to the output of said transmission to utilize vehicle inertia to effect the speed of rotation of said one shaft in such a direction and to such an extent as to facilitate completion of a shift in said first section and substantially the entire time of shifting of said first section is available for synchronization.

26. In a change-speed transmission for vehicles a first change-speed section having a pair of shafts including an output shaft and gears on said shafts providing a plurality of spaced speed ratios stepped down in substantially equal percentages to provide a given range of speed change, a second change-speed section having an input shaft connected to the output shaft of said first change-speed section and having gearing providing two speed ratios stepped down an amount equivalent to said given range of speed change of said first change-speed section plus a down step giving a percentage down equal to the percentage change between ratios in said first change-speed section, means including a pair of friction clutches associated with said second section for connecting one of said shafts through a selected ratio in said second section to the output of said transmission; manually preselectable means, and means responsive both to the position of said first section and to one position of said preselectable means for effecting said connecting while the gears of said first section are in neutral position; whereby said connection of said one shaft to said output will utilize the vehicle inertia to affect the speed of rotation of said one shaft in such a direction and to such an extent as to facilitate completion of a shift in said first section.

27. In a change-speed transmission for vehicles a first change-speed section having a shift lever, a pair of shafts including an output shaft and gears on said shafts providing a plurality of spaced speed ratios stepped down in substantially equal percentages to provide a given range of speed change, a second change-speed section having an input shaft connected to the output shaft of said first change-speed section and having gearing providing two speed ratios stepped down an amount equivalent to said given range of speed change of said first change-speed section plus a down step giving a percentage down equal to the percentage change between ratios in said first change-speed section, means including a source of energy and a pair of control means connected in series and to said source of energy, for shifting the second section when, and only when, the first section enters into neutral position, one of said control means being automatically actuated for effecting shifting each time, and as soon as, the main transmission enters into neutral position and the other control means being manually actuable for effecting shifting at the will of an operator, the time of commencing the shift of the second section and the capacity of the synchronizers being such that the shift of the second change speed gearing can be completed during a continuous motion of the shift lever at a normal rate through neutral position; whereby actuation of said manually actuable means, followed by return of the first change speed gearing to neutral, effects an automatic shift of the second section.

28. In a change speed transmission for a vehicle, the combination comprising: a first change speed gear group including a shift lever, an input shaft, a main shaft and a countershaft and gearing constantly driving said countershaft from said input shaft and other gearing selectively engageable between said countershaft and said mainshaft to connect said countershaft with said mainshaft through a selected one of a plurality of ratios; a second change speed gear group connected to said mainshaft and providing two auxiliary speed ratios and including synchronizers between pairs of auxiliary gears, the differential between said auxiliary ratios being not less than the total ratio change available from a selected portion of the gears in the first gear group; means, including a source of energy and a pair of control means connected in series and to said source of energy, for synchronizing the second gear group when, and only when, the first gear group enters into neutral position, one of said control means being automatically actuated for effecting shifting each time, and as soon as, the first gear group enters into neutral position and the other control means being manually actuable for effective shifting at the will of an operator, the time of commencing the shift of the second gear group and the capacity of the synchronizers being such that the shift of the second change speed gearing can be completed during a continuous motion of the shift lever at a normal rate through neutral position; whereby actuation of said manually actuatable means, followed by return of the first change speed gearing to neutral, effects an automatic shift of the second gear group.

29. In a change speed transmission for a vehicle, the combination comprising: a first change speed gear section including an input shaft, a main shaft, a countershaft, a shifting member and gearing controlled by said shifting member for constantly driving said countershaft from said input shaft and other gearing selectively engageable between said countershaft and said mainshaft to connect said countershaft with said mainshaft through a selected one of a plurality of ratios; a second change speed gear section connected to said mainshaft and having at least two speed ratios, means including a pair of friction clutches associated with said second section for connecting one of said shafts through a selected ratio in said second section to the output on said transmission; a power shifter operably connected to said second section for changing it from one gear ratio to another, a first control for said power shifter operably connected to control the supply of power thereto and operably connected to said shifting member of said first change-speed gear section for actuation by movement of said shifting member from an engaged to the neutral position to release the supply of power to said power shifter on such movement, and a second control for said power shifter independent of said first control but in series therewith and operably connected to control the supply of power to said power shifter and including a manually operable member to release the flow of power to said power shifter on manual operation whereby the operator of the transmission may control said second control at will whereby upon movement of said shifting member of said first change-speed gear section from engaged to neutral position and upon operation of said manually operable member of said second control, power will be supplied to said power shifter and one of the shafts of said first change-speed gear section may be connected through a selected ratio in said second section to the output of said transmission to utilize vehicle inertia to effect the speed of rotation of said one shaft in such a direction and to such an extent as to facilitate completion of a shift in said first section and substantially the entire time of shifting of said first section is available for synchronization.

30. In a change speed transmission for a vehicle, the combination comprising: a first change speed gear group including an input shaft, a main shaft and a countershaft and gearing constantly driving said countershaft from said input shaft and other gearing selectively engageable between said countershaft and said mainshaft to connect said countershaft with said mainshaft through a selected one of a plurality of ratios; a second change speed gear group connected to said mainshaft and having change speed gears effecting a pair of gear ratios whose speed differential is approximately one half step greater than the speed range of a selected portion of the first gear group; controllable means for automatically shifting the second gear group; a pair of control means for said controllable means in series with each other, one thereof being manually preselectable into and out of shift effecting position and the other thereof being actuable to its position for effecting shifting each time said first change speed gear group is in substantially neutral position, whereby upon appropriate preselection of said one control means said second gear group will become synchronized immediately upon the entry of the first change speed gear group into neutral position.

31. In a change speed transmission for a vehicle, the combination comprising: a main change speed gear set including a shift lever, an input shaft, a main shaft and a countershaft and gearing constantly driving said countershaft from said input shaft and other gearing selectively engageable between said countershaft and said mainshaft to connect said countershaft with said mainshaft through a selected one of a plurality of ratios; an auxiliary change speed gear set connected to said mainshaft and providing two auxiliary speed ratios, and including synchronizers between pairs of auxiliary gears, the differential between said auxiliary ratios being not less than the total ratio change available from a selected portion of the gears in the main gear set; means for automatically shifting the auxiliary gear set, at the will of an operator but when and only when the main gear set enters into neutral position, said means including a pair of control elements in series and a source of energy, one of said elements being automatically moved into position for shifting the auxiliary gear set each time the main gear set enters into neutral position and the other element being manually movable at the will of the operator into position for shifting the auxiliary gear set, the time of commencing the auxiliary shift and the capacity of the synchronizers being such that the synchronizing of the auxiliary gear set can be substantially completed during a continuous motion of the shift lever at a normal rate through the first half of its neutral position; whereby actuation of said other element followed by return of the main gear set to neutral at the end of a shift progression through the ratios of the main gear set effects an automatic shift of the auxiliary gear set.

32. In a change-speed transmission for vehicles a main change-speed gear group having a shift lever, a pair of shafts including an output shaft and gears on said shafts providing a plurality of spaced speed ratios stepped down in substantially equal percentages to provide a given range of speed change, an auxiliary change-speed gear group having an input shaft connected to the output shaft of said main change-speed group and having gearing providing two speed ratios stepped down an amount equivalent to said given range of speed change of said main change-speed group plus a down step giving a percentage down equal to the percentage change between ratios in said main change-speed group having gears with synchronizers therebetween for providing direct and reduction gear ratios wherein the differential in gear ratios is not less than the entire range of gear ratios in the main group; means for automatically shifting the auxiliary gear group at the will of an operator but only when the main gear group enters into neutral position, said means including a source of energy and first and second control elements in series, said first element being actuated to position for shifting the auxiliary gear group each time the main gear group enters into neutral position and said second element being manually actuable to its position for effecting a shift of the auxiliary gear group, the time of commencing the auxiliary shift and the capacity of the synchronizers being such that the synchronizing of the auxiliary gear group can be completed during a continuous motion of the shift lever at a normal rate through neutral position; whereby actuation of said second control element, followed by return of the main gear group to neutral at the end of a shift progression through the ratios of the main gears, effects an automatic shift of the auxiliary gear group.

33. In a multiple speed transmission, as for trucks, the combination comprising: a main change speed gear group wherein the entire range of gear ratios totals not more than approximately one half the range of the entire transmission and operable by a shift lever; an auxiliary change speed gear group having gears with synchronizers therebetween and providing direct and reduction gear ratios wherein the differential between said direct and reduction gear ratios is approximately equal to the entire range of the main gear group plus the difference between a pair of successive gear ratios in said main gear group; means including a source of energy and a pair of control means connected in series and to said source of energy for shifting the auxiliary gear group when, and only when, the main change speed gear group enters into its neutral position one of said control means being automatically actuated for effecting shifting each time the main gear group enters into neutral position and the other of said controls being manually actuable for effecting shifting at the will of an operator, the time of commencing the auxiliary shift and the capacity of the synchronizers being such that the synchronization of the auxiliary group can be substantially completed during a continuous motion of the shift lever at a normal rate through the first half of its neutral position; whereby actuation of said manually operable control means followed by the return of the main gear group to neutral at the end of a shift progression through the ratios of the main gear group effects an automatic shift of the auxiliary gear group.

THOMAS BACKUS.
ELLIOT L. LUDVIGSEN.

References Cited in the file of this patent

UNITED STATES PATENTS

| Number | Name | Date |
| --- | --- | --- |
| 1,943,694 | Padgett | Jan. 16, 1934 |
| 2,242,276 | Vincent | May 20, 1941 |
| 2,251,464 | Neracher | Aug. 5, 1941 |
| 2,254,334 | Vincent | Sept. 2, 1941 |
| 2,465,885 | Koster | Mar. 29, 1949 |